United States Patent
Ohara et al.

[11] Patent Number: 5,844,720
[45] Date of Patent: Dec. 1, 1998

[54] PRISM SHEET

[75] Inventors: Shuzo Ohara; Takumi Kosugi; Osamu Kawaguchi; Tetsuro Taen; Kenji Kawashima; Yu Tsuyama, all of Osaka, Japan

[73] Assignee: Goyo Paper Working Co., Ltd., Osaka, Japan

[21] Appl. No.: 558,183

[22] Filed: Nov. 15, 1995

[30] Foreign Application Priority Data

Sep. 8, 1995 [JP] Japan .................................... 7-256871

[51] Int. Cl.⁶ .............................. G02B 5/02; G02B 5/04; F21V 7/04
[52] U.S. Cl. ........................... 359/599; 359/831; 359/837; 362/31; 362/331; 362/339
[58] Field of Search ...................... 359/599, 619, 359/831, 837; 362/26, 31, 331, 339; 349/62, 63, 64, 65, 95, 112

[56] References Cited

U.S. PATENT DOCUMENTS

| | | | |
|---|---|---|---|
| 5,122,709 | 6/1992 | Kawamura et al. . | |
| 5,289,351 | 2/1994 | Kashima et al. | 362/26 |
| 5,394,255 | 2/1995 | Yokota et al. | 362/31 |
| 5,592,332 | 1/1997 | Nishio et al. | 359/619 |
| 5,598,280 | 1/1997 | Nishio et al. | 362/31 |

*Primary Examiner*—Ricky D. Shafer
*Attorney, Agent, or Firm*—Armstrong, Westerman, Hattori, McLeland & Naughton

[57] ABSTRACT

A prism sheet having a plurality of substantially triangular prism-shaped lens units with their longitudinal axes almost parallel to each other arranged on one side and having the other side roughened, and with a characteristic value of 100 when said roughned side is smooth, the characterstic values are not less than 50 in glossiness, not more than 70 in internal reflective ability, and not more than 70 in friction coefficient when the plane including the prism peaks is rubbed by the roughened surface. The prism sheet of the present invention is therefrom free from interference fringes, substantially safe from scratching and uniform and high in brightness, being thus useful for liquid crystal devices etc.

4 Claims, 1 Drawing Sheet

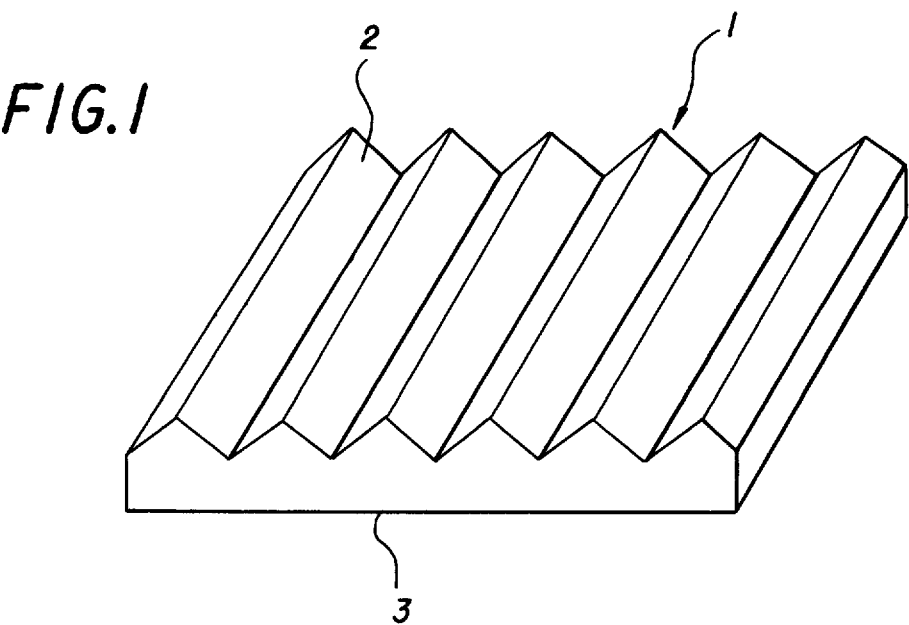
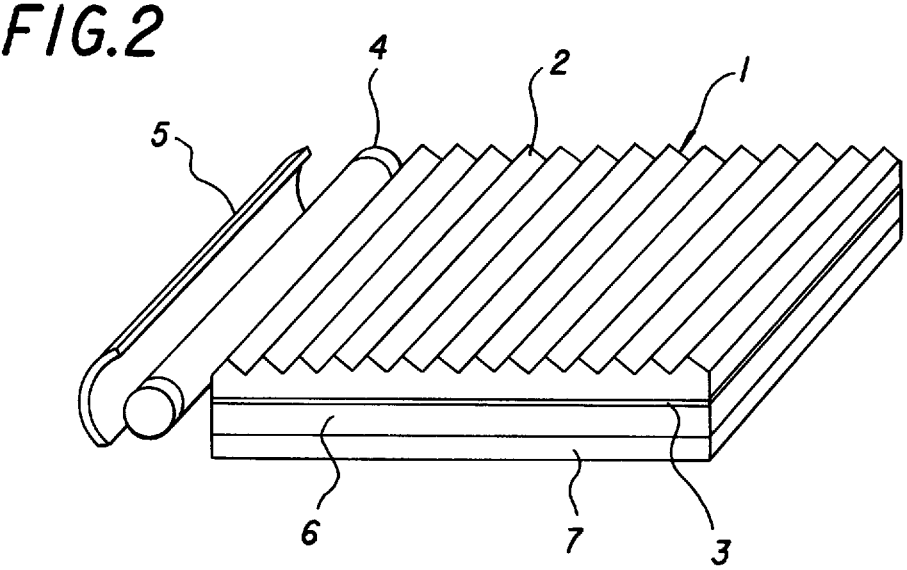

PRISM SHEET

BACKGROUND OF THE INVENTION

1. Field of the Invention

The present invention relates to a prism sheet suited for liquid crystal display devices such as liquid crystal TVs, computers and word processors and, more particularly, to a prism sheet capable of providing display devices, uniform and high in brightness, safe from interference fringes, and less susceptible to damage.

2. Description of the Related Art

In recent years, there have been increasing demands for weight-saving, thinning, improved brilliancy and power-efficient of liquid crystal display devices used in office automation devices, personal computers, word processors, etc. There has been a strong desire for thinning and improving brightness of the backlight along with the improvement of the liquid crystal display mechanism and various attempts have been made for improving the brightness of the backlight.

Improving the brightness of the backlight by increasing the supplied power results in increased power consumption, increased calorific power, etc., and such disadvantages as greater battery capacity and shortened battery life are inevitable with portable units.

For these reasons, improvements of cold cathode ray tube and invertor as well as improved light efficiency of the backlight are desired. With liquid crystal display devices, the brightness to the front of an observer is important. With the one lamp type advantageous for thinning the unit, the light emitted from one end is caused to be emitted uniformly to the entire surface of the display, hence the light having passed the light diffusion layer is non-directive and the brightness of the light having passed the liquid crystal phase is not sufficient for the observer sitting in front. Thus, recently a method of again imparting directivity for the improvement of brightness has been suggested. Various specific lens sheets have been devised.

An example of a lens sheet for the improvement of brightness is a method of using prisms and U.S. Pat. No. 4,906,070 and Japanese Laid-open Pat. Publication No. 14410/'87 a thin flexible film made of a polymeric material comprising a structured surface on one side and a smooth surface opposite said structured surface on the other side is proposed, wherein said structured surface includes a linear array of miniature isosceles prisms having substantially perpendicular sides arranged side-by-side to form a plurality of peaks and grooves. The perpendicular sides of the prisms make an angle of approximately 45° with the smooth surface opposite the structured surface. This film is useful for reflecting the ray internally and not for use in a crystal liquid display device.

The example in which this kind of film was used for the improvement of the backlight of the liquid display device is proposed in Japanese Laid-open Pat. Publication No. 127159/'93 and the example in which the arranging method is devised is proposed in Japanese Laid-open Pat. Publication No. 323319/'93 etc.

More recently, Japanese Laid-open Pat. Publication No. 109925/'94 shows the possibility of applying a film having the first surface of prism structure and the second surface of optical roughness to the backlight so as to make the printed dot pattern invisible. The roughness of the second surface is similar to that of a frosted glass and the dimension between the adjacent peaks is 10 $\mu$m, which is necessary for obtaining the same brightness in nearly all directions within 180°.

A similar lens sheet is proposed in Japanese Laid-open Pat. Publication No. 324205/'94 and according to this patent application the lens sheet has formed on one side thereof groups of projections whose height is not less than the wavelength of the light source ray and not more than 100 $\mu$m. It is then possible to form a gap of not less than the light source ray wavelength between the lens sheet and the light conduction plate, and if a lens sheet is placed that plate, the light source ray can be uniformly distributed inside the whole light conduction plate because light is entirely reflected by the surface of the light conduction plate, it is considered that even in the case of one-lamp type edge light, there is no risk of brightness increasing with decreasing distance therefrom.

Meanwhile, U.S. Pat. No. 4,542,449 and Japanese Examined Patent Publication No. 3780/'89, describe a method in which the smooth back surface of a right angled isosceles triangle prism sheet forms the first surface of the illumination panel in order to improve the directivity of the illumination panel where, this prism surface is adjacent to the smooth surface of the second sheet and the two sheets are laid one upon the other so that the prism corrugate direction of the second sheet is at a predetermined angle against that of the first sheet and, that light enters from the smooth surface of the first sheet and emerges from the prism corrugate surface of the second sheet. In this case, application of the present invention to liquid crystal display devices is not taken into consideration and no description is made about the prevention of interference fringes resulting from laying of the two prism sheets one upon the other.

When improvement of the backlight is attempted by the use of lens sheets using prisms, it is essential to prevent, among other things, visual recognition of dot patterns of the light conduction plate, uniformity of light source rays between the light conduction plates and occurrence of interference fringes and, further, occurrence of interference fringes when two prism sheets for the improvement of brightness are laid one upon the other.

For this purpose, such methods as providing some kind of roughness on the back of the prism sheet are known but their effects are insufficient and especially formation of roughness is likely to interfere with the improvement of brightness. Thus, it is important to prevent occurrence of interference fringes without adversely affecting the improvement of brightness as much as possible.

Further, a lens sheet having sharp vertical angles is likely to have the prism peaks damaged as it is handled, causing visible scratch of light. Thus, it is essential to minimize such damage.

SUMMARY OF THE INVENTION

It is an object of the present invention to provide a prism sheet useful for liquid crystal display devices, which is uniform and high in brightness, safe from interference fringes and less susceptible to damage.

Other objects and advantages of the present invention will become apparent to those skilled in the art from the detailed description given below.

The present invention relates to a prism sheet, which has units of lenses comprising substantially triangular prisms with their longitudinal axes almost parallel in a surface on one side and a roughened surface on the other side, wherein if the characteristic values should be 100 when the aforementioned roughened surface is smooth, the prism surface of the sheet is not less than 50 in glossiness, not more than 70 in internal reflective ability and not more than 70 in friction coefficient when the plane including the prism peaks is rubbed by the roughened surface, whereby the prism sheet is free from interference fringes, safe from being scratched and thus suited for uniform and high-brightness liquid display devices can be provided.

BRIEF DESCRIPTION OF THE DRAWINGS

FIG. 1 is a perspective view of the prism sheet of the present invention; and

FIG. 2 is a perspective view of the prism sheet used in backlight.

DETAILED DESCRIPTION OF THE PREFERRED EMBODIMENT

Hereinafter the present invention will be described with reference to a detailed description of the preferred embodiment.

As a lens sheet for improving the brightness of backlight for liquid crystal displays a lenticular lens comprised of connected semicircles, a lens sheet of connected circumferential curves or a lens sheet in which quadrangular pyramids are disposed, has been proposed, but most effective for improving brightness is a prism sheet 1 with a plurality of triangular prisms 2 disposed side-by-side and spaceless, as shown in FIG. 1.

The vertical angle of the triangular prism 2 preferably ranges from 70° to 110°. If it is less than 70° or more than 110°, the resulting improvement in brightness is small. This vertical angle is a substantial angle and if some curvature should take place, there is no problem unless a marked lowering of brightness is caused and if the prism 2 used has its length from the vertical angle to each hypotenuse is substantially the same, it is preferable since light is then focused in the normal direction of the base of the prism, namely the front of the observer. In order to make a linear fringe pattern of the prism caused by light outgoing through the prism sheet 1 less discernible, it is preferable to make the distance between the adjacent prism units 2 to be 10–1,000 μm, more preferably 10–500 μm, most preferably 10–100 μm. The height of the prism unit is determined by the interval and the vertical angle of the prism. The thickness of the sheet is preferably within a range of 50–1,000 μm. If its thickness is less than 50 μm, it results in an insufficient mechanical strength, while if it is in excess of 1,000 μm, it is disadvantageous about light permeability, weight-saving and thinning.

The shape of the other side 3 of the prism sheet 2 has a great influence on its performance. Especially it is of great influence with regard to the improvement of the brightness of the backlight which is the principal purpose of the prism sheet 1 and, further, it influences the possibility of light unevenness such as interference fringes supposed to be caused by close adhesion to the diffusion plate on which is placed the prism sheet 1 used for backlight as well as the interference fringes taking place between prism sheets 1 when it is desired to further improve the brightness by laying a plurality of prism sheets 1 one upon another. A common method for preventing such close adhesion or occurrence of interference fringes is, among others, to provide a gap by means of projections.

For example, in Japanese Laid-open Utility Model Publication No. 10901/'94, the surface opposite the light conduction plate is smooth, and it is proposed to form convexes thereon, and it is demonstrated to be more effective for preventing brightness unevenness caused by close adhesion to the light conduction plate compared with an embossed sheet. Further, Japanese Laid-open Patent Publication No. 102506/'94 proposes visible transparent dots with a height of not more than 0.25 mm and an interval of not more than 1.20 mm on the smooth side of prism to prevent moire caused by interference between prism grooves and transparent electrodes of the liquid crystal display plate. Also, Japanese Laid-open Patent Publication No. 151909/'95, describes as necessary for the prevention of occurrence of interference fringes equal in thickness between two film lenses to provide projections whose height is corresponding to the maximum wavelength of not less than 12.5 μm under normal ray. This idea of securing air gap requires relatively large projections and thus is likely to retard improvement of the brightness, hence some other method free from causing damage and also for making such projections invisible must be employed.

The present inventors submit that for the prevention of interference fringes, surface roughness-caused scattering of light is more effective than providing gap between sheets. For example, interference fringes are clearly observed when a prism sheet having a smooth back is placed on a smooth glass plate. When a thin sheet without prism units and its surface merely roughened, is placed thereon, the aforementioned interference fringes are no longer visible when the surface roughness is beyond a certain limit. When the degree of surface roughness required for causing vanishing of interference fringes as it is inserted between a prism sheet with its back smooth and a glass plate is examined, the result almost agrees with the result obtained when it is laid on the prism sheet. This indicates that scattering of light is more effective than presence of gap. When the same is performed on the backlight to see the influence on the improvement of brightness, improvement in brightness is more marked when the roughened sheet is inserted between the prism sheet and the glass plate. The interference fringes occur without fail when one prism sheet having a smooth back is laid on the glass plate and then the second prism sheet is laid thereon such that the longitudinal axes of the prism are perpendicular to each other and the smooth surface of the first sheet is adjacent to the prism corrugate surface of the second sheet. Occurrence of interference fringes cannot be prevented by only inserting a roughened sheet of any kind between the glass plate and the prism sheet. When a roughened sheet is laid on the top of two prism sheets, the degree of roughness required for interference fringes becoming invisible is great and the then brightness is low. When roughened sheets are inserted one at a time between the glass plate and each prism sheet and the visibility of interference fringes is checked, the result shows that occurrence of interference fringes can be prevented by providing a relatively small degree of roughness. It is advisable to roughen the back of each prism sheet, since the required degree of roughness is then less. Further, the brightness attainable is likely to be higher in this case. In case of backlight, the roughness of the back of the first prism sheet on the diffusion plate may be made less than that on the back of the second prism sheet. However, the degree of roughness with the two sheets may as well be the same, this being advantageous economically as only one set of molds is needed for the production thereof.

The roughness of the back of the prism sheet largely influences the improvement of brightness attainable. When backlight is used, the back of the prism sheet corresponds to a plane of incidence. In order to see the relationship between the roughness of the back and the improvement of brightness attainable, it is advisable to see the glossiness attainable at each incident angle.

The glossiness of a thin sheet smooth on both sides is higher as observed from a direction closer to the normal and is lower when the incident angle is greater. When one side is roughened, glossiness becomes smaller at every angle and, when the degree of lowering is calculated with reference to a sheet smooth on both sides, the degree of lowering increases with an increasing angle. Since the glossiness at 60° is taken as average, it is proper to take the glossiness at 60° for representing the degree of lowering corresponding to a given degree of roughness.

Meanwhile, when the particular side is structured with prisms, glossiness varies depending on the relationship between the incident angle and the prism direction. It is without relation to the prism direction that glossiness is higher as the incident angle comes closer to the normal direction and is lower with increasing incident angle. Especially when the incident direction agrees with the prism direction, glossiness is markedly higher than when they are perpendicular to each other. This is particularly the case when the incident angle is small and close to the normal direction. When, in order to clarify the influence of roughness of the back, the glossiness of the prism sheet with its back smooth is taken as reference, and the degree of its lowering is compared after division thereby, the glossiness is markedly lowered as the normal direction is approached, unlike in the case where no prism is used, and the degree of lowering is greatest when the incident light and the prism direction are perpendicular to each other, and increased is the difference from when they are parallel. This is supposed to be due to high dependence of the internal reflective ability of prism, hence it is advisable to observe internal reflective ability described later.

Meanwhile, when the incident angle exceeds 45°, influence on glossiness of the prism position, parallel or perpendicular, becomes less, the specular glossiness at 60° can be represented by the average taken in cases where the prisms are parallel and perpendicular to each other, or in the absence of prisms. In order to define the characteristics of roughness, it is advisable to take the glossiness at 60° as 100 when the back is smooth, and to represent it by the degree of lowering determined by division thereby.

The relationship between the effect of the prism sheet to improve the brightness on the backlight and the degree of lowering the specular glossiness at 60° by the roughness of the back is close. The effect to prevent occurrence of intereference fringes appears gradually as the degree of lowering of the 60° specular glossiness exceeds 80 downward, the brightness is lowered still rather gradually until it reaches 50 and markedly goes down after passing this limit.

The degree of roughness of the back largely influencing the scattering of light preventing occurrence of interference fringes is best represented by the internal reflective ability with the prism surface as reflective side and roughened back as plane of incidence. With the reflection intensity as 100 when the back is smooth, the effect of preventing the occurrence of interference fringes starts appearing when the internal reflective ability of the roughened back is 70, and the effect becomes more marked when the limit goes downward. When it becomes less than 40, the effect is to improve the brightness. Hence, in order to best prevent occurrence of interference fringes and to best improve the brightness, it is desired to form the roughness in which the roughness of the back-induced lowering of the 60° glossiness is small and internal reflective ability-induced lowering is large. Specifically, when the value for a smooth surface is taken as 100, the glossiness is required to be not less than 50 and the internal reflective ability is not greater than 70.

The prism sheet with the back smooth taken as a standard may be prepared with the smooth side as one face in the process of manufacture of the prism sheet or, alternatively, the back of the prism sheet roughened may be coated smooth with the same or a similar material after manufacture of the prism sheet.

It is often the case that two prism sheets are used laid one upon the other and, in such a case, it is desired to protect against damage of the prism peaks. Generally it is known that a film or a sheet has its slidability improved when a proper roughness is imparted to its surface. With a prism sheet laid with the prism surface up, another identical prism sheet is laid thereon with the back down and the friction coefficient is measured under a given load in the longitudinal and perpendicular directions of the prism. Although the friction coefficient is dependent upon the kind of the material and the form of the surfaces rubbing against each other, the roughened prism sheet is lower in friction coefficient than the smooth counterpart in both frictional directions. Now the roughness-induced lowering of the friction coefficient and its influence on the risk of damage to the prism peak will be studied. When a manipulation same as measurement of the friction coefficient was repeated several times with a given material, it was recognized that with a prism sheet whose friction coefficient was lowered by surface roughness, it was easy to keep the potential to improve its brightness. This is supposed to be due to protection from damage to the prism peaks by the improved slidability of the prism sheet and it turned out that this is particularly noticeable when the friction coefficient of the roughened back is less than 70 with that of smooth back as 100. It was seldom the case that the value was less than 10.

The degree of roughness is measurable with various measuring instruments but generally taken as simple is a method by the use of a surface roughness tester. The tester tracer is moved on a surface and its vibration is measured electrically for the calculation of the result. As seen from the definition and the designation of the surface roughness in JIS B 0601, this characteristic value is represented by center line average roughness (Ra), maximum height (Rmax) and 10-point average roughness (Rz), and the 10-point average roughness is best suited for representation of the degree of roughness in terms of difference in height. From the roughness chart thus obtained, the average value (Sm) for the peak or groove distance with reference to the average height line is calculated. It is also possible to calculate by drawing a straight line on a microscopic picture and counting the number of peaks or grooves crossed thereby. The roughness suited for the purpose of the present invention is 0.4 $\mu$m–2.0 $\mu$m in 10-point average roughness (Rz) and 30 $\mu$m–200 $\mu$m in average distance (Sm) between peaks or grooves.

It is most preferred to impart roughness to the back according to the height h of the prism. Both proper 10-point average roughness (Rz) and average values (Sm) for the peak or groove distance for the average height h are determinable. The present inventors have found out that within a preferable range of distance between adjacent prism units, 10–500 $\mu$m, the degree of roughness required for the prevention of occurrence of interference fringes is greater with increasing height of the prism. Since the degree of roughness is in proportion to the aforementioned Rz and in inverse proportion to Sm, h is in proportion to Rz/Sm. Hence, we also have found out that the most preferable ranges of Rz, Sm and h satisfy the following equation (1).

$$h = K \times Rz/Sm \tag{1}$$

The proportional constant K is properly within the range of $1\times10^3$ to $4\times10^3$ experimentally when h, Rz and Sm are expressed in μm. Rz is optimum to be 0.4–2.0 μm and Sm 30–200 μm and Rz and Sm satisfy the equation (1).

The prism sheet 1 of the present invention is made of a transparent material. As transparent material, there are included thermoplastic resins including homopolymers or copolymers of acrylic ester or methacrylic ester such as polymethyl methacrylate and polymethyl yacrylate, polyesters such as polyethylene terephthalate, polybutyrene terephthalate and their modified copolymers, polycarbonate, polystyrene, polymethylpentene, cyclic polyolefin polymer and its modified copolymers, or multi-functional resins which can be crosslinked by means of ultraviolet ray or electronic ray. These are usable either alone or in combination.

The method of molding a prism sheet is not particularly limited and a method of hot press molding, a sheet embossing method, a method of transferring from a three-dimensionally patterned release sheet and an injection molding method. Some degree of deviation or deformation of the vertical angle, apex edge, prism side or base is tolerable, if the effect of the present invention is still noticeable.

Known methods may be used for imparting roughness to the back 3 such as phototype process-based etching, sandblasting using sand or metal particles, and sill-roll method of duplication under enlargement from an engraved master roll, and a method of controlling the surface roughness by selection of the kind and size of the particles used, or by means of collision energy, collision frequency, etc. is preferred.

Although various methods have been devised for the use of the prism sheet 1 of the present invention, it is generally known to place a lens plane with prisms disposed therein on a light diffusion plate of the backlight of a liquid crystal display device on the light outgoing side. The direction of the longitudinal axis of the prism 1 is free but it may agree with the direction of the edge light of the cold cathode ray tube or may as well be perpendicular thereto. When it is desired to improve the brightness, the same or similar prism sheets may be used laid one upon another. In this case, the effect is enhanced when the longitudinal direction of the second prism sheet is perpendicular to that of the first prism sheet.

Although a luminous device for the backlight used in the present invention may be of either the underneath type or the edge light type, but the edge light type 4 which can easily be made thinner is preferred. A luminous device of the edge light type 4 has a small-diameter cold cathode ray tube 5 arranged on edges of a light conduction part 6 made of a transparent material having a good light transmission rate. It may be of a two-lamp type (not shown) with the cathode ray tubes arranged on both edges or of one-lamp type arranged on one edge. Generally, a diffusion plate is located on the surface of the light conduction part and a reflective material 7 is positioned on the back and edges thereof. Usually, the lens sheets are located on or underneath this diffusion plate.

The present invention will be described in greater detail by way of examples, but the present invention is by no means limited thereby.
EXAMPLE 1
(1) Preparation of prism sheet One mold A for a face in which a plurality of linear isosceles prisms are arranged side-by-side such that the peak edges of the isosceles triangle 90° in vertical angle, 25 μm in the height of peak and 50 μm in base are parallel and another mold B for the other faces flat, varied in the degree of roughness and varied in distance between peaks or grooves, called B-1 to B-8.

A 230 μm-thick sheet of non-crystalline cyclic olefin copolymer (Apel 6011T manufactured by Mitsui Petrochemical industry Co., Ltd.) was placed on a hot press sandwiched between the molds A and B with its thickness decreased to 200 μm, held for 15 min. at 250° C. in a mold temperature and 100 Kg/cm² in pressure and then allowed to cool to the room temperature for the preparation of a prism sheet.

When examined through a microscope and from a sectional picture, the resulting prism sheet had its prism shape nearly in agreement with the mold design values.
(2) Measurement of glossiness 60° specular glossiness was measured according to the plastic optical property measuring method JIS K 7105 for glossiness and by the use of a glossimeter (manufactured by Nippon Denshoku Kogyo) with the sample in two alternative positions; one is for the longitudinal direction of the prism to be perpendicular to the incident light and the other is for the same to be parallel, with the smooth back or roughened back according to the mold B serving as reflecting surface with light shaded by a black plate placed thereon. The glossiness of the roughened back was determined with that of smooth back as 100, and the lowering of glossiness of the roughened back was represented by the average of values when the peaks are perpendicular and when they are parallel.
(3) Measurement of internal reflective ability Internal reflective ability was measured according to the plastic optical property measuring method JIS K 7105 for internal reflective ability and by the use of internal reflective ability tester (Suga Shikenki K. K., NS-1) with the sample set so that the prism back is the plane of incidence and measurement was taken at an incident angle of 0° and an observing angle of 0.2°. In this case, the illumination on the sample for calibration is adjusted to 10.76 Lx and the intensity of light reflected therefrom is measured. The reflective intensity so measured was 3.5 cd/10.76 Lx. In this case, too, the value for the prism sheet with its back smooth was taken as 100 and the value for the prism sheet with its back roughned was taken in proportion thereto.
(4) Measurement of brightness when prism sheet is provided for backlight Electric power 5 V and 0.6 ampere was applied through an invertor to a cold cathode ray tube attached to one end of the longer side of a backlight 166 mm×129 mm (8 inches) for a liquid crystal display. This emission device had a reflection plate on its back and a diffusion plate on its surface and brightness was measured by a luminance calorimeter (Topcon Inc., BM5A) from 700 mm normally off the surface of the diffusion plate.

Eight kinds of prism sheets were placed on the diffusion plate with the prism surface in the light outgoing direction and with the longitudinal direction of the prism parallel to the longer side in agreement with the direction of the cold cathode ray tube, the brightness at three points, namely the center of the luminous plane and 35 mm on both sides thereof in the direction of the shorter side, and the average thereof was taken as the representative value. The average of the brightness at the three points without placing the prism sheet was 1,084 cd/m². With this as the brightness of the luminous source, the number of folds the brightness was raised was determined.
(5) Measurement of friction coefficient and observation of abrasion Measurement of the friction coefficient of a plastic sheet was made according to ASTM D 1894-78 by the use of a horizontal-type peeling tester (Tester Sangyo, constant speed peeling tester). A plastic sheet sample about 80 mm wide and 250 mm long was fixed on a horizontal plane, another sample was fixed to the surface of a 1 kg metal block 60 mm×100 mm and was pulled horizontally at a constant speed of 30 mm/sec., and the required tension was read by a load cell. The sample was fixed to the horizontal stationary surface with its prism surface down and to the movable surface with its roughened back down and the friction coefficient therebetween was measured. The static friction coefficient was calculated by dividing the first peak force at the moment the weight started moving by the weight-induced vertical load and the dynamic friction coefficient was calculated by dividing the frictional force by the weight-induced vertical load while the weight was still moving. The measurement was taken when the direction of pulling the movable part was the same as and perpendicular to the direction of the prism longitudinal axis.

These four kinds of coefficients are shown in Table 1. There were no marked differences among these four coefficients, hence, average was taken thereof and it was shown as a proportional value with the coefficient for the sheet with its back smooth made by the B-1 mold as 100. Further, samples were prepared, each thereof abrased ten cycles at the same place by the same manipulation as the measurement of friction coefficient in a direction perpendicular to the prism longitudinal axis, and the brightness was measured on the backlight and the abrasion-induced variation was observed.

(6) Observation of interference fringes

A sample was stuck to a glass plate with the prism surface up in a bright room and it was observed from every direction to see whether interference fringes were visible. Then, another sample was laid thereon with the prism longitudinal axis perpendicular to each other and visibility of interference fringes was checked.

(7) Measurement of surface roughness

The roughness of the back of the prism sheet was measured according to JIS B 0601 clarifying the definition and designation of surface roughness and by the use of a tracer-type surface roughness tester (K. K. Mitsuyo, Supertest 301). This JIS defines that the average of differences between the height of up to the fifth peak and the depth of up to the 5th groove in the standard length of 0.8 mm is the 10-point average roughness Rz, and this definition was supposed to be proper for the purpose. On the basis of the resulting surface roughness chart, the average of the distances between the adjacent peaks or bottoms measured along the average line at the average height was taken as the average distance Sm of the roughness. This measurement was taken of the surface of the mold B as well as of each prism sheet.

Besides the aforementioned eight kinds of prism sheets, a B-6 coated sheet sample whose roughned surface was made smooth by coating with a 20% methyl ethyl ketone solution of the same material for the total thickness of 3 $\mu$m and its characteristic values are shown in Table 1.

TABLE 1

| Kind of mold B | | | Unit | B-1 | B-2 | B-3 | B-4 | B-5 | B-6 | B-7 | B-8 | B-6 coated |
|---|---|---|---|---|---|---|---|---|---|---|---|---|
| Roughned surface of mold B | Rz | | $\mu$m | * — | 0.3 | 0.3 | 0.5 | 0.8 | 1.2 | 1.8 | 2.2 | |
| | Sm | | $\mu$m | — | 150 | 80 | 60 | 73 | 73 | 80 | 84 | |
| Roughned back of prism sheet | Rz | | $\mu$m | — | 0.3 | 0.3 | 0.5 | 0.7 | 1.0 | 1.5 | 2.0 | — |
| | Sm | | $\mu$m | — | 100 | 89 | 67 | 73 | 80 | 73 | 89 | — |
| 60° glossiness | Perpendicular | | | 98.3 | 98.0 | 91.1 | 82.7 | 79.0 | 72.2 | 60.1 | 46.3 | 98.1 |
| | Proportion to B-1 | | % | 100 | 99.7 | 92.6 | 85.7 | 80.4 | 73.4 | 61.1 | 47.1 | 99.8 |
| | Parallel | | | 481 | 476.8 | 452.8 | 450.3 | 315.2 | 274.0 | 207.3 | 132.8 | 495 |
| | Proportion to B-1 | | % | 100 | 99.1 | 94.1 | 93.6 | 65.5 | 51.4 | 43.1 | 27.6 | 102.9 |
| | Average lowering | | % | 100 | 99.4 | 93.4 | 89.5 | 73.0 | 62.4 | 52.1 | 37.4 | 101.4 |
| Internal reflective ability | Reflective intensity | | cd/10.76Lx | 1.28 | 0.94 | 0.96 | 0.88 | 0.84 | 0.69 | 0.61 | 0.27 | 1.30 |
| | Proportion to B-1 | | % | 100 | 73.4 | 75.0 | 68.8 | 65.6 | 53.9 | 47.7 | 21.1 | 101.6 |
| Brightness on backlight | Brightness | | cd/m$^2$ | 1405 | 1403 | 1398 | 1388 | 1377 | 1366 | 1345 | 1217 | 1403 |
| | Improvement | | fold | 1.30 | 1.29 | 1.29 | 1.28 | 1.28 | 1.26 | 1.24 | 1.13 | 1.29 |
| Interference fringes | 1 sheet | | | Presence | Presence | Absence | Absence | Absence | Absence | Absence | Absence | Presence |
| | 2 sheets | | | Presence | Presence | Presence | Absence | Absence | Absence | Absence | Absence | Presence |
| Performances upon friction | Friction coefficient | Parallel to longitudinal axes | Static | 0.858 | 0.604 | 0.542 | 0.388 | 0.234 | 0.175 | 0.235 | 0.151 | 0.806 |
| | | | Dynamic | 0.860 | 0.588 | 0.545 | 0.403 | 0.198 | 0.165 | 0.165 | 0.172 | 0.745 |
| | | Perpendicular to longitudinal axes | Static | 0.938 | 0.546 | 0.388 | 0.375 | 0.218 | 0.268 | 0.204 | 0.134 | 0.735 |
| | | | Dynamic | 0.663 | 0.456 | 0.437 | 0.352 | 0.188 | 0.198 | 0.188 | 0.146 | 0.689 |

TABLE 1-continued

| Kind of mold B | | Unit | B-1 | B-2 | B-3 | B-4 | B-5 | B-6 | B-7 | B-8 | B-6 coated |
|---|---|---|---|---|---|---|---|---|---|---|---|
| Performance after 10 perpendicular cycles of friction | Total average | | 0.830 | 0.549 | 0.478 | 0.379 | 0.202 | 0.201 | 0.198 | 0.151 | 0.743 |
| | Proportion to B-1 | % | 100 | 66.1 | 57.6 | 45.7 | 24.3 | 24.2 | 23.9 | 18.2 | 89.5 |
| | Brightness | cd/m$^2$ | 1328 | 1385 | 1380 | 1358 | 1355 | 1370 | 1322 | 1202 | 1318 |
| | remaining ratio | % | 94.5 | 98.7 | 98.7 | 97.8 | 98.4 | 100.3 | 98.3 | 98.8 | 93.9 |
| Proportional constant K of equation (1) | | ×10$^3$ | — | 8.3 | 7.4 | 3.4 | 2.6 | 2.0 | 1.2 | 0.95 | — |

\* — Unmeasurable

As is apparent from the results shown in Table 1, with the characteristic value of B-1 whose back is smooth as 100, B-4, B-5, B-6 and B-7 satisfying all requirements i.e. not less than 50 in glossiness, not more than 70 in internal reflective ability and not more than 70 in friction coefficient are high in brightness, free from interference fringes, safe from scratching, high in brightness remaining ratio after ten perpendicular cycles of friction and have well-balanced favorable performances.

In contrast thereto, B-8 less than 50 in glossiness has a low rate of brightness improvement, B-1, B-2, B-3 and B-6 coated, exceeding 70 in internal reflective ability are all subject to interference fringes and B-1 and B-6 coated, exceeding 70 in friction coefficient both have a low brightness remaining ratio.

The proportional constant K for prism height (h), 10-point average roughness (Rz) and average value (Sm) for inter-peak or inter-groove distance was between 0.95×10$^3$ and 3×10$^3$ and B-4, B-5, B-6 and B-7 were within a range of K=1–4×10$^3$, showing proper characteristic values.

EXAMPLE 2

Polycarbonate (Teijin Ltd., AD 5503) sheets 230 μm thick obtained by the use of molds B-1, 4 and B-6 of the same types A and B used in Example 1 were held for 15 min. in a hot press at a mold temperature of 270° C. and prism sheets were thus obtained. From the microscopic sectional pictures of these prism sheets, the height of each prism was 24 μm. Table 2 shows the characteristic values of these prism sheets by the same method as in Example 1. The brightness of the light source in this case was 1,129 cd/m$^2$.

The roughened back of a prism sheet made by the use of B-6 mold was coated with a 15% methylene chloride solution of the same polycarbonate to a finished thickness of 3 μm with protecting the prism surface by a masking film. The characteristic values of this sample are shown in Table 2 as those of B-6 coated.

Reference Example

The characteristic values of a commercial available polycarbonate prism sheet with each prism isosceles triangle 90° in vertical angle and 50 μm in base were evaluated in the same way as in Example 1 and shown in Table 2 as those of commercial PC.

TABLE 2

| Kind of mold B | | | unit | B-1 | B-4 | B-6 | B-6 coated | commercial PC |
|---|---|---|---|---|---|---|---|---|
| Roughened surface of mold B | Rz | | μm | *1 — | 0.5 | 1.2 | | |
| | Sm | | μm | — | 60 | 73 | | |
| Roughened back of prism sheet | Rz | | μm | — | 0.4 | 1.0 | — | |
| | Sm | | μm | — | 67 | 80 | — | |
| 60° glossiness | Perpendicular | | | 99.3 | 90.8 | 68.2 | 98.7 | 102.6 |
| | Proportion to B-1 | % | | 100 | 91.4 | 68.7 | 99.4 | 106.1 |
| | Parallel | | | 563.2 | 484.4 | 450.2 | 558.3 | 571.2 |
| | Proportion to B-1 | % | | 100 | 86.0 | 62.2 | 99.1 | 101.4 |
| | Average lowering | % | | 100 | 88.7 | 65.5 | 99.3 | 102.0 |
| Internal reflective ability | Reflective intensity | | cd/10.76Lx | 1.56 | 0.94 | 0.78 | 1.53 | 1.63 |
| | Proportion to B-1 | % | | 100 | 60.3 | 50.0 | 98.0 | (104.5)*2 |
| Brightness on back-light | Brightness | | cd/m$^2$ | 1479 | 1475 | 1463 | 1485 | 1534 |
| | Improvement | fold | | 1.31 | 1.30 | 1.29 | 1.32 | 1.36 |
| Interference fringes | 1 sheet | | | Presence | Absence | Absence | Presence | Presence |
| | 2 sheets | | | Presence | Absence | Absence | Presence | Presence |

TABLE 2-continued

| Kind of mold B | | | unit | B-1 | B-4 | B-6 | B-6 coated | commercial PC |
|---|---|---|---|---|---|---|---|---|
| Perfor-mances upon friction | Fric-tion coe-ffici-ent | Parallel to longi-tudinal axes | static | 450 | 347 | 230 | 530 | 330 |
| | | | dynamic | 525 | 353 | 275 | 485 | 460 |
| | | Perpen-dicu-lar to longi-tudinal axes | static | 670 | 368 | 343 | 612 | 250 |
| | | | dynamic | 680 | 387 | 350 | 580 | 310 |
| | Total average | | | 581 | 364 | 300 | 552 | 338 |
| | Proportion to B-1 | | % | 100 | 62.7 | 44.0 | 95.0 | (58.1)*2 |
| Perfor-mance after 10 per-pendi-cular cycles of friction | Brightness | | cd/m² | 1442 | 1453 | 1448 | 1442 | |
| | remaining ratio | | % | 97.5 | 98.5 | 99.7 | 97.1 | |
| Proportional constant K of equation (1) | | | ×10³ | — | 4 | 1.9 | — | — |

*1 — Unmeasurable
*2 Proportion to 100 in the case of B-1

As is apparent from the results shown in Table 2, with the characteristic value of B-1 whose back surface is smooth as 100, B-4 and B-6 satisfying all requirements i.e. not less than 50 in glossiness, not more than 70 in internal reflective ability and not more than 70 in friction coefficient are high in brightness, free from interference fringes, safe from scratching, high in brightness remaining ratio after ten perpendicular cycles of friction and have well-balanced favorable performances.

In contrast thereto, B-1, B-6 coated and commercial PC exceeding 70 in internal reflective ability are all subject to interference fringes and B-1 and B-6 coated exceeding 70 in friction coefficient are low in brightness remaining ratio after 10 perpendicular cycles of friction. The proportional constant K showing the relation among h, Rz and Sm was $4\times10^3$ with B-4 and $1.9\times10^3$ with B-6, both being in a proper range.

EXAMPLE 3

Prism sheets were prepared in the same way as in Example 1 except that the prism comprises isosceles triangles 16 μm in height of peak and 32 μm in base and their characteristic values are shown in Table 3. In this case, the light source brightness was 1,129 cd/m³.

The prism sheet sectional picture shows that the height of the prism is 15.5 μm, hence from Table 3 Rz/Sm is 0.0056 and when 15.5 is divided by 0.0056, K=2.76 results, this being within an optimum range.

TABLE 3

| | Kind of mold B | | unit | B-1 | B-4 |
|---|---|---|---|---|---|
| Roughned surface of mold B | Rz | | μm | * — | 0.5 |
| | Sm | | μm | — | 60 |
| Roughned back of prism sheet | Rz | | μm | — | 0.4 |
| | Sm | | μm | — | 72 |
| 60° glossiness | Perpendicular | | | 98.7 | 91.3 |
| | Proportion to B-1 | | % | 100 | 92.5 |
| | Parallel | | | 498.4 | 420.1 |
| | Proportion to B-1 | | % | 100 | 84.3 |
| | Average lowering | | | 100 | 88.4 |
| Internal refle-ctive ability | Refelctive intensity | | cd/10.76Lx | 1.26 | 0.81 |
| | Proportion to B-1 | | % | 100 | 64.5 |
| Brightness on backlight | Brightness | | cd/m² | 1442 | 1423 |
| | Improvement | | fold | 1.28 | 1.26 |
| Interference fringes | 1 sheet | | | Presence | Absence |
| | 2 sheets | | | Presence | Absence |
| Performances upon friction | Fric-tion coe-ffici-ent | Parallel to longitu-dinal axes | static | 475 | 341 |
| | | | dynamic | 505 | 325 |
| | | Perpendicu-lar to lon-gitudinal axes | static | 620 | 346 |
| | | | dynamic | 678 | 377 |

TABLE 3-continued

| | Kind of mold B | unit | B-1 | B-4 |
|---|---|---|---|---|
| | Total average | | 569 | 347 |
| | Proportion to B-1 | % | 100 | 61.0 |
| Performance | Brightness remaining | cd/m$^2$ | 1346 | 1405 |
| after 10 perpen- | ratio | % | 96.8 | 98.8 |
| dicular cycles | | | | |
| of friction | | | | |
| Proportional constant K of equation (1) | | ×10$^3$ | — | 2.76 |

\* — Unmeasurable

As mentioned above, the prism sheet of the present invention is free from interference fringes, substantially safe from scratching and uniform and high in brightness, being thus useful for liquid crystal devices or the like.

What is claimed is:

1. A prism sheet having arranged on one side a plurality of substantially triangular prism-shaped lens units with their longitudinal axes almost parallel to each other and having a roughened surface on the other side, and with 100 assigned as a reference characteristic value for each of glossiness. reflective ability and friction coefficient when said other side is smooth, said characteristic value is not less than 50 in glossiness, not more than 70 in internal reflective ability, and not more than 70 in friction coefficient when the side containing the lens units is in contact with a roughened surface of another prism sheet which is identical to said roughened surface on said other side of said prism sheet.

2. The prism sheet of claim 1, wherein the vertical angle of said triangular prism-shaped lens units is in a range of 70°–110° and the distance between adjacent prism units is in a range of 10–100 μm.

3. The prism sheet of claim 1 or 2, wherein the each said roughened surface has a ten-point average roughness Rz of 0.4–2.0 μm and the average distance Sm between adjacent peaks of each said roughened surface is 30–200 μm.

4. The prism sheet of claim 3, wherein the relationship among the roughened surface in 10-point average roughness Rz, the average distance Sm between the adjacent peaks and the prism height h is as shown in the following equation (1), and the proportional constant K is in a range of $1\times10^3$–$4\times10^3$:

$$h = K \times Rz/Sm.$$

\* \* \* \* \*